June 13, 1967 A. M. SCHAIBLE 3,325,171
ROTATING SPEED CONTROL MECHANISM
Filed April 13, 1966 3 Sheets-Sheet 2

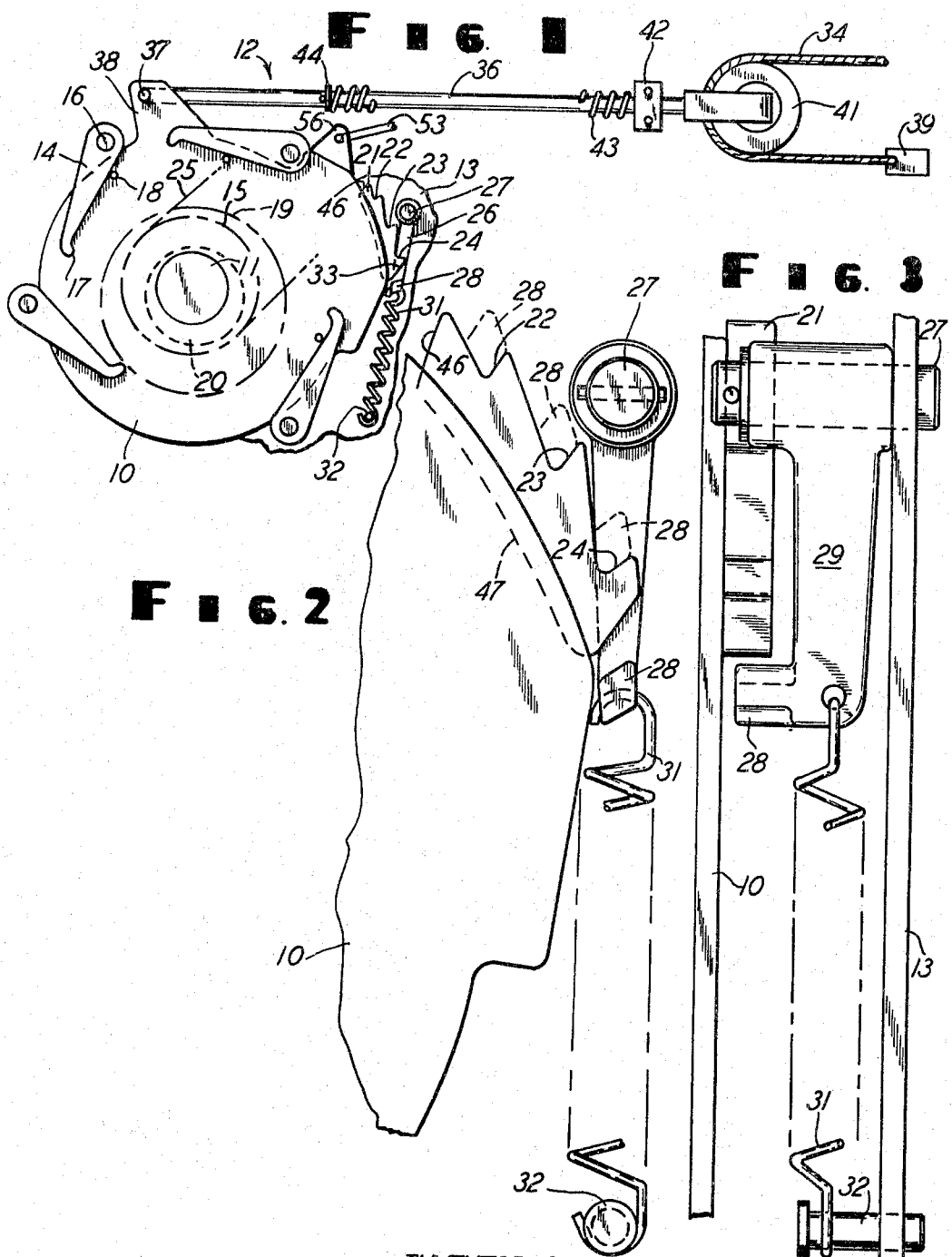

INVENTOR:
AARON M. SCHAIBLE
By: Arthur J. Hansmann, Atty.

United States Patent Office 3,325,171
Patented June 13, 1967

3,325,171
ROTATING SPEED CONTROL MECHANISM
Aaron M. Schaible, Rockford, Ill., assignor to J. I. Case Company, Racine, Wis., a corporation of Wisconsin
Filed Apr. 13, 1966, Ser. No. 542,396
6 Claims. (Cl. 275—6)

ABSTRACT OF THE DISCLOSURE

A first set of a rotational driving member and a rotational driven member, with index means connected between these two members for selecting relative rotational speed between the two members. A second set of a rotational driving member and a rotational driven member, with means connected between the first set and the second set. A clutch is interposed between the members of the second set and is operative to clutch therebetween in accordance with the selected positioning of the index means.

---

This invention relates to a rotational speed control mechanism.

This particular invention has utility in controlling the speeds of the conveyor and the beater in a manure spreader. Accordingly, the invention is described in that particular art. It is therefore to be understood that the manure spreader may be attached to a tractor which both tows and powers the spreader in its function of distributing the fertilizer onto the ground. The manure spreader of course includes the conveyor disposed along the bed of the spreader box, and it also includes a beater or widespread which is rotatably mounted at the rear of the box for engaging the manure or fertilizer brought rearwardly in the box by the conveyor. The beater then engages the manure and distributes it in the box and onto the ground.

This invention is concerned with the control of the speeds of the conveyor and the beater or widespread. It is a general object of this invention to provide an improved control over these components of a mechanically operated and power manure spreader.

A more specific object of this invention is to provide a rotational speed control mechanism which can be governed by a single control member, such as a cable or rope extending from the manure spreader to a convenient position within the reach of the operator on the tractor. In accomplishing this object of providing a single control, the operator can therefore control both the speed of the conveyor and the operation, including the stopping and starting, of the beater or widespread.

Still another object of this invention is to provide a rotational speed control mechanism useful between two sets of rotating members, wherein the transmitting of rotation from one member to another member in one set will be desirably imposed on the rotational relationship between the two rotating members in the other set. That is, altering the speed of rotation between the two members in the first set will also desirably affect the rotational relationship between the members in the second set. In the instance shown, and with regard to the manure spreader application, this means that the increase of speed of the conveyor will ultimately result in the de-clutching of the drive to the beater or widespread, as desired.

Another object of this invention is to provide a rotational drive mechanism in a manure spreader, wherein the members of the first of two rotational sets may be rotated at various speeds while the members of the second of the two rotational sets are also rotated, but at speeds independent of the rotation of the members in the first set. Then, ultimately, the members of the second set may be disengaged at a selected point of rotational speed of the members of the first set.

Other objects and advantages become apparent upon reading the following description in light of the accompanying drawings, wherein:

FIG. 1 is a side elevational view of a preferred embodiment of this invention with parts thereof broken away.

FIG. 2 is an enlarged side elevational view of a fragment of FIG. 1 showing parts thereof in different positions in dotted lines.

FIG. 3 is end elevational of FIG. 2, with parts added.

Figure 6:
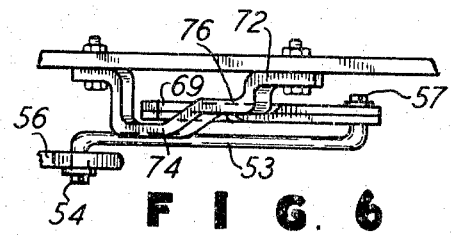
FIG. 6 is a top plan view of parts shown in FIG. 4.

FIG. 1 shows a mechanism similar to that shown in U.S. Pat. No. 3,036,837 in that it discloses a ratchet pawl-throwout plate 10 which would be mountable on the side of a manure spreader or other implement where this mechanism has utility. Thus the plate 10 is comparable to the plate designated 216 in said patent and shown for instance in FIG. 6 thereof. The plate is rotatably supported about a shaft 11, and it is controlled in rotation by a control means generally designated 12 and more fully described later.

The piece fragmentarily shown and designated 13 may be the side of the manure spreader or other implement, and it is a stationary piece. A plurality of pawls 14 are pivotally mounted on the box 13 by means of pins 16. It will be understood that the pawls 14 are spring-loaded to be urged with the ends 17 thereof moved toward the shaft 11, all in the customary manner of operating the indexing mechanism of this nature. Pins 18 restrain the pawls 14 from engagement with a ratchet wheel which is eccentric with respect to the shaft 11 and is indicated by the dot-dash line designated 19. A sprocket 15 is rotatable on the shaft 11, and it has an eccentric hub 20, on which the sprocket 19 is rotatably mounted, and a chain 25 drives the sprocket 15. Also, the sprocket 19 is rotatably connected to the shaft 11.

Figure 7:
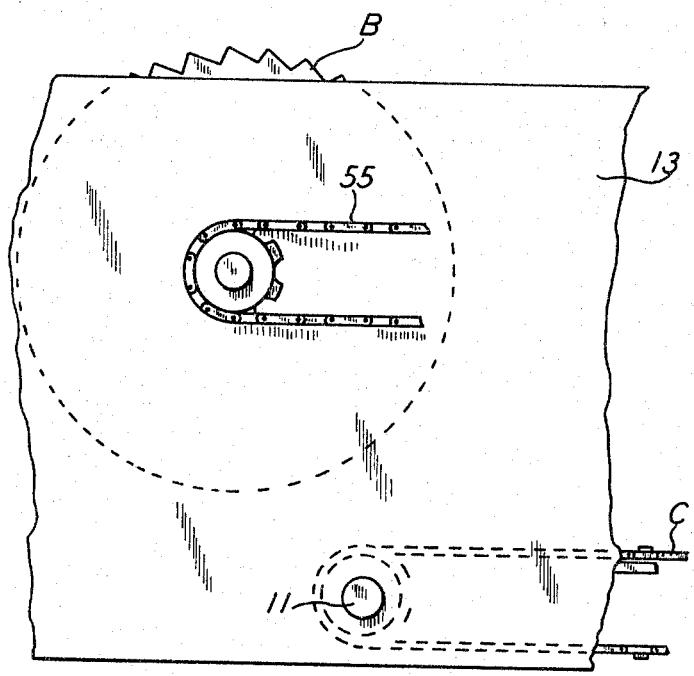
FIG. 7 is a side elevational view of a fragment of a spreader box, and showing a beater and a conveyor.

Generally, it will be understood by one skilled in the art that rotation of the plate 10 will move the pins 18 away from their respective pawls 14 so that the pawl ends 17 can engage the teeth of the ratchet wheel designated by the circle 19. In this manner, rotation is transmitted between the sprocket 15 and the ratchet wheel 19 and to the shaft 11. The shaft 11 may be the source of the drive of a conveyor C, in FIG. 7 which also shows a beater B.

The aforementioned is conventional, and the following thus describes the indexing mechanism of this invention, and it relates it to the conventional mechanism described. The indexing plate 10 has a piece 21 affixed thereto such that the piece 21 rotates with the rotation of the plate 10. The piece 21 has a series of notches 22, 23, and 24 on the radially outer edge thereof as shown. FIG. 3 shows that the plate 21 is offset with respect to the plate 10, and this is for a purpose which will be apparent later.

A locking dog 26 is pivotally mounted on the piece 13 by means of a pivot pin 27. The lower end of the dog has a projection 28 which extends laterally of the main body 29 of the dog 26, as shown in FIG. 3. The projection 28 is shaped similar to the configuration of the notches 22, 23, and 24, and FIG. 2 shows the projection 28 in three dotted positions designated 28 and nested in the notches mentioned. The dotted showings of projection 28 are merely relative with respect to the index cam 21, and it will be of course understood that the locking dog 26 essentially remains in the position shown in the drawing while the plate 10 and its indexing cam 21 rotate to where the dog projection 28 engages the several notches described.

A tension spring 31 connects to one end of the dog 26 and is anchored on a pin 32 at the lower end of the spring 31. Thus the spring 31 constantly yieldingly urges the dog 26 into the postion shown in FIG. 1, but of course it permits the dog to pivot sufficiently to have the projection 28 ride over the cam surface 33 of the plate or cam 21 when the latter is rotated toward the projection 28. It will therefore be apparent that the spring 31 urges the pawl 26 to align on its elongated axis in the direction between the pins 27 and 32.

Thus, upon rotating the plate 10 to where a selected one of the notches 22, 23, or 24, is engaged with the projection 28, then the plate 10 is restrained from rotating back into the opposite direction, and then the selected ones of the pawls 14 are engaged with the ratchet wheel 19 for the necessary rotatable connection between the shaft 11 and the sprocket 15.

FIG. 1 further shows the control mechanism 12 which permits the operator to rotate the plate 10 from a remote position such as his location on a tractor or the like. It is also significant to note that the control mechanism 12 can utilize a flexible member such as the rope 34, and yet the plate 12 is movable in both the clockwise and the counter-clockwise direction of rotation as will be apparent later. The mechanism 12 thus includes a rod 36 which is connected at its end 37 to a projection 38 on the plate 10 such that axial displacement of the rod 36 will control the rotated position of the plate 10. The rope 34 is anchored at a piece 39 which may be stationary on the spreader or the like. The rope extends over a pulley 41 to reverse the direction of the rope 34 and to permit the axial displacement of the rod 36 as mentioned. The rod 36 extends through a stationary mounting bracket 42 which may be mounted on the spreader in the fixed position. A compression spring 43 extends between the bracket 42 and a stop collar 44 on the rod 36. Thus, upon release of the tension or pull on the rope 34, the spring 43 will push against the collar 44, as permitted by the abutment of the spring 43 against the stationary bracket 42, and this will cause the plate 10 to rotate in the counter-clockwise direction as viewed in FIG. 1.

Of course the clockwise rotation of the plate 10 is induced by a pull on the rope 34, and such rotated position is retained by the pawl projection 28 engaging one of the selected notches 22, 23, or 24 on the plate 10. Further pull on the rope 34 will cause the upper edge 46 of the plate 21 to pass completely below the projection 28, and the latter therefore simply is free to slide along the back surface designated 47 of the index cam 21 as the plate 10 rotates counter-clockwise under the influence of the spring 43 as described. In this manner, the indexing mechanism is set in its selected position by movement of the plate 10 in one direction, and it is also released, with respect to being retained by the pawl 26, by further movement of the plate 10 in the said one direction. Accordingly, a flexible piece such as the rope 34 is all that is needed for complete control of the mechanism.

Figure 4:
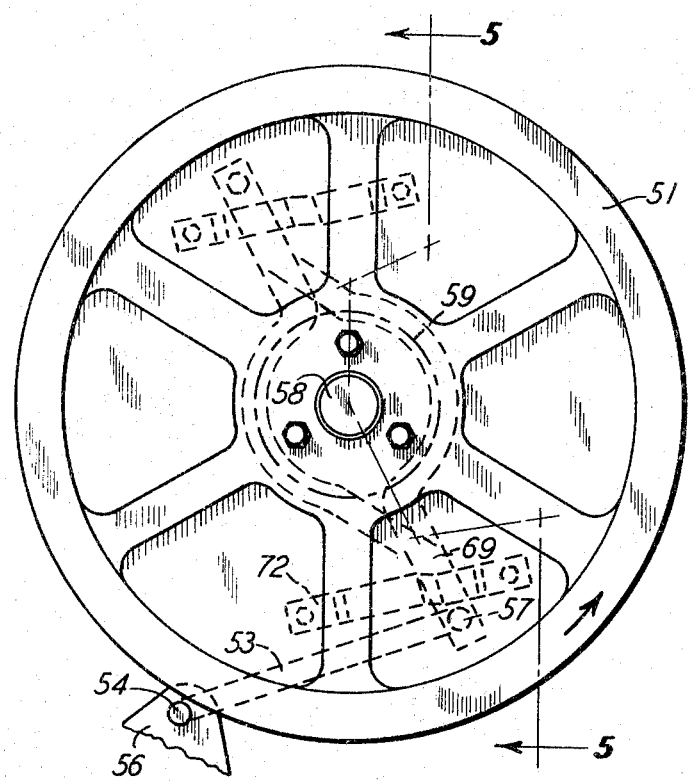
FIG. 4 is a side elevational view of another portion of the embodiment, and showing a fragment of it as related to the showing in FIG. 1, and with parts thereof removed.
Figure 5:
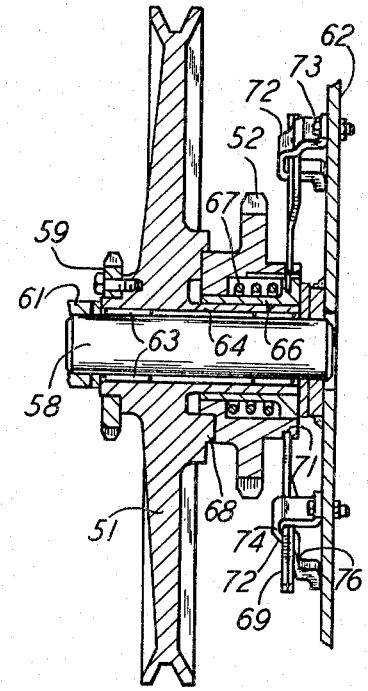
FIG. 5 is a sectional view taken substantially along the broken line 5—5 of FIG. 4.

FIG. 1 therefore shows the first set of two rotatable members, the driving sprocket 15 and the driven shaft 11, for instance. FIGS. 4 and 5 show the second set of two rotatable members, the large pulley 51 and the sprocket 52. These two sets are connected by a connecting rod 53 which is attached at one end 54 to an extension 56 on the rotatable plate 10. Thus, rotation of the plate 10 will also rotate the projection 56 and thereby actuate the connecting rod 53. The rod 53 extends to the second set of rotatable members, and the opposite end 57 of the rod 53 is shown in FIG. 4, and FIG. 6 shows the full rod 53.

The pulley 51 is comparable to the pulley 72 in the referenced patent, in that the drive from the tractor may come to the pulley 51 which is rotatably mounted on the shaft 58 and which rotatably carries the sprocket 59 to have the latter rotate with the pulley 51. The sprocket 59 may thus also engage the chain 25 so that the two rotational sets are connected together.

The pin or shaft mounting 58 may be supported in a bracket 61 and in a non-movable member 62, which may be the side of the spreader. The sprocket 51 is thus rotatably mounted on the pin 58 by means of bearings 63. The sprocket 51 has a hub 64 which supports a sleeve 66 which in turn supports the sprocket 52. The sprocket 52 has a chain 55 which extends to the beater or widespread B of the manure spreader, in FIG. 7. This would therefore be like the sprocket 36, chain 32, and widespread 26 of the referenced patent. The sprocket 52 is axially slidable on the sleeve 66, and the compression spring 67 urges the sprocket 52 toward the pulley 51. A clutch, such as a jaw clutch shown by jaws 68, may be provided between the pulley 51 and the sprocket 52 so that when the latter is under the influence of the spring 67 and thereby urged to the left in the position in FIG. 5, then the sprocket 52 is in direct driving relation with the pulley 51.

Throw-out arms 69 are engaged in a circular groove 71 extending around the hub of the sprocket 52. These arms thus permit rotation of the sprocket 52, but they control the axial position of the sprocket 52 for de-clutching the latter with respect to the pulley 51. This is accomplished by means of brackets 72 which are irregularly shaped to provide cams, and which are secured to the side wall 62 by means of bolts 73. Thus the brackets 72 have high portions 74 and low portions 76, and the throw-out arms 69 extend through the brackets as shown. Thus, rotation of the throw-out arms 69 will dispose their radially outer ends under either the high portions 74 or the lower portions 76 of the brackets 72. When the throw-out arms 69 are under the high portion 74, then the sprocket 52 can be in its left-most position, which is the position of rotational engagement with the pulley 51. However, when the throw-out arms 69 are rotated to where their ends go under the lower portion 76 of the brackets 72, then the arms 69 are displaced to the right in FIG. 5, and this correspondingly displaces the sprocket 52 to de-clutch it from the pulley 51. In this manner, the drive relation between the pulley 51 and the sprocket 52 is controlled.

Of course the actuation of the throw-out arms 69 as described is accomplished through the connecting rod 53 and its position in relation to the index plate 10. That is, initial rotation of the plate 10 clockwise to engage notches 24 and subsequently 23, will only pivot the arm 53 about its end 57. However, when the plate 10 is rotated to where notch 22 is engaged by the pawl end 28, then the rod 53 is displaced to pull on the throw-out arms 69 and de-clutch as described.

Thus, the manure spreader's conveyor C can be run at its fastest speed without running the beater B. The conveyor C can therefore clean the box 13. Also, if the mechanism is unknowingly set for the fastest conveyor speed when the spreader is started, the manure will not be fed against the rotating beater B, since the beater B is then idle. This protects against damage to the beater B. Still further, at the fastest conveyor speed, fertilizer can be row-distributed rather than broadcast, since the beater B is idle.

While a specific embodiment of this invention has been shown and described, it should be obvious that certain changes could be made in the embodiment and the invention should therefore be determined only by the scope of the appended claims.

What is claimed is:

1. A rotational speed control mechanism comprising a first set of a rotational driving member and a rotational driven member, adjustable indexing means operatively connected between said members for transmitting selected speeds of rotation between said driving and driven members in accordance with the setting of said indexing means, adjustment means connected to said indexing means for selective adjustable setting of said indexing means, a second set of a rotational driving member and a rotational driven member, a clutch disposed between said driving member and said driven member of said second set, and connecting means operatively connected with said indexing means and being operative on said clutch for effecting clutching action in response to the selective adjustable setting of said indexing means.

2. The subject matter of claim 1, wherein said driven member of said first set includes a ratchet wheel eccentric to the axis of said driving member of said first set, and said indexing means includes a plurality of pawls operatively connectable with said ratchet wheel, such that the driving speed of rotation from said driving to said driven members of said first set is in accordance with the number of said pawls indexed into engagement with said ratchet wheel, and said connecting means is adapted to be operative on said clutch for clutching action only when a minimum number of said pawls are engaged with said ratchet wheel.

3. The subject matter of claim 2, wherein said connecting means includes a connecting rod operatively connected at one end to said pawls for displacing said one end along with the indexing of said pawls, and said connecting means includes cam means for actuating said clutch, and with the opposite end of said connecting rod being operatively connected to said cam means.

4. The subject matter of claim 1, wherein said clutch is axially operative and said connecting means includes a cam for axial displacement of said clutch.

5. The subject matter of claim 1, including a manure spreader having a box with both a conveyor and a manure beater disposed on said box, and wherein said first set is drivingly connected to said conveyor, and said second set is drivingly connected to said beater, and said sets are drivingly connected together.

6. The subject matter of claim 5, wherein said adjustment means includes a remote control device available to the operator for actuating said indexing means, for controlling the speed of said conveyor, and for subsequently actuating said clutch for controlling said beater.

References Cited
UNITED STATES PATENTS

| | | | |
|---|---|---|---|
| 2,775,329 | 12/1956 | Stelljes | 19—93 |
| 3,036,837 | 5/1962 | Miller | 275—3 |
| 3,172,554 | 3/1965 | Fickle | 275—6 |

EVON C. BLUNK, *Primary Examiner.*

RICHARD E. AEGERTER, *Examiner.*